United States Patent
Shina et al.

(10) Patent No.: US 10,147,989 B2
(45) Date of Patent: Dec. 4, 2018

(54) SYSTEM FOR GENERATING POWER FROM FUEL CELL WASTE HEAT

(71) Applicant: ORMAT TECHNOLOGIES INC., Reno, NV (US)

(72) Inventors: Elad Shina, Tel-Aviv (IL); Carl Nett, Stafford Springs, CT (US)

(73) Assignee: ORMAT TECHNOLOGIES INC., Reno, NV (US)

( * ) Notice: Subject to any disclaimer, the term of this patent is extended or adjusted under 35 U.S.C. 154(b) by 26 days.

(21) Appl. No.: 14/904,768

(22) PCT Filed: Jul. 14, 2014

(86) PCT No.: PCT/IB2014/001320
§ 371 (c)(1),
(2) Date: Jan. 13, 2016

(87) PCT Pub. No.: WO2015/008131
PCT Pub. Date: Jan. 22, 2015

(65) Prior Publication Data
US 2016/0156083 A1   Jun. 2, 2016

Related U.S. Application Data

(60) Provisional application No. 61/846,240, filed on Jul. 15, 2013.

(51) Int. Cl.
*H01M 14/00* (2006.01)
*F01K 25/14* (2006.01)
*F01K 25/08* (2006.01)

(52) U.S. Cl.
CPC ............ *H01M 14/00* (2013.01); *F01K 25/08* (2013.01); *F01K 25/14* (2013.01);
(Continued)

(58) Field of Classification Search
CPC ............ H01M 14/00; H01M 2250/10; H01M 2250/405; F01K 25/14; F01K 25/08; Y02B 90/16; Y02B 90/14
(Continued)

(56) References Cited

U.S. PATENT DOCUMENTS 6,571,548 B1 * 6/2003 Bronicki ................ F01K 23/10
60/39.181
7,260,934 B1 * 8/2007 Roberts .................... F01K 13/02
60/651
(Continued)

FOREIGN PATENT DOCUMENTS

DE   100 45 899 A1   4/2002
JP   H11-46460 A    2/1999
(Continued)

OTHER PUBLICATIONS

International Search Report and Written Opinion of the International Searching Authority dated Mar. 3, 2015, in PCT/IB2014/001320 Filed Jul. 14, 2014.
(Continued)

*Primary Examiner* — Hoang Nguyen
(74) *Attorney, Agent, or Firm* — Oblon, McClelland, Maier & Neustadt, L.L.P.

(57) ABSTRACT

The present invention is directed to a system for generating power from fuel cell waste heat, comprising: at least one fuel cell module for generating power and producing waste heat; a bottoming cycle power block through which a motive fluid circulates to generate power; a waste heat heat-transfer unit for transferring heat from exhaust gases of the at least one fuel cell module to the bottoming cycle power block motive fluid thereby producing a desired combined power level from the at least one fuel cell module and the bottoming cycle power block.

15 Claims, 3 Drawing Sheets

(52) U.S. Cl.
CPC .. *H01M 2250/10* (2013.01); *H01M 2250/405* (2013.01); *Y02B 90/14* (2013.01); *Y02B 90/16* (2013.01)

(58) Field of Classification Search
USPC .................................. 60/655, 651, 660, 671
See application file for complete search history.

(56) References Cited

U.S. PATENT DOCUMENTS

| | | | | |
|---|---|---|---|---|
| 7,658,072 | B2* | 2/2010 | Masada | F01K 23/02 60/655 |
| 8,181,463 | B2* | 5/2012 | Batscha | F01K 25/08 60/651 |
| 2003/0170518 | A1* | 9/2003 | Clawson | H01M 8/04022 429/423 |
| 2003/0218385 | A1 | 11/2003 | Bronicki | |
| 2006/0010872 | A1 | 1/2006 | Singh et al. | |
| 2006/0080985 | A1* | 4/2006 | Inaba | B60H 1/00885 62/238.6 |
| 2007/0175212 | A1* | 8/2007 | Uno | F01C 13/04 60/519 |
| 2009/0071156 | A1* | 3/2009 | Nishikawa | F01K 13/02 60/660 |
| 2009/0320477 | A1 | 12/2009 | Juchymenko | |
| 2010/0291455 | A1 | 11/2010 | Biederman et al. | |
| 2012/0036854 | A1* | 2/2012 | Vaisman | F01K 17/02 60/671 |

FOREIGN PATENT DOCUMENTS

| | | |
|---|---|---|
| JP | 2000-123851 A | 4/2000 |
| JP | 2005-43046 A | 2/2005 |
| JP | 2006-506819 A | 3/2008 |
| WO | WO 20131100490 A1 | 7/2013 |
| WO | 2013/136131 A1 | 9/2013 |

OTHER PUBLICATIONS

Office Action dated Mar. 6, 2018 in Japanese Patent Application No. 2016-526716 w/English-language Translation.

Office Action dated Mar. 29, 2017 in German Patent Application No. 11 2014 003 274.3 w/English-language Translation.

Paul Scherrer Institute, Vom Nadelloch Zum Ploztlichen Tod, "From the Eye of the Needle to Sudden Death": How Fuel Cells Age, Feb. 13, 2013.

\* cited by examiner

SYSTEM FOR GENERATING POWER FROM FUEL CELL WASTE HEAT

FIELD

The present invention relates to the field of power plants. More particularly, the invention relates to a system for generating power from fuel cell waste heat.

BACKGROUND

A fuel cell generates electricity directly through electrochemical reactions and is more efficient than a heat engine because it eliminates the mechanical or rotating machinery. The electrical energy conversion efficiency of most fuel cells is relatively high, ranging from 40 to 60 percent based on the lower heating value (LHV) of the fuel, regardless of size and load.

Because of their inherent efficiency and potential for low emissions, high-temperature fuel cells (HTFC) such as solid oxide fuel cells (SOFC) and molten carbonate fuel cells (MCFC) have been the subject of intense research for several decades.

Fuel cells are associated with some significant drawbacks despite their high energy conversion efficiency.

Firstly, the remaining energy content of a fuel cell system that is not converted to electricity, a high level on the order of 50%, is lost as waste heat through the fuel cell cooling system and exhaust gas heat. The energy efficiency of a power producing system would increase significantly if a portion of the fuel cell waste heat would be able to be exploited.

Secondly, fuel cells requiring high capital costs have a relatively short life span, generally ranging from two to five years, due to the high temperature and accepted electrolyte type that lead to corrosion of the anode and cathode. Thus, the efficiency of a MCFC and SOFC decreases over time, their power output decreases, and the exhaust heat from these fuel cells increases. As a result of such fuel cell degradation and poor profitability, their commercial life span is limited. Additional expenditures are required if it is desired to recycle a fuel cell. The use of fuel cells for power generation has therefore been quite limited up to the present day.

There have been several attempts in the prior art to generate power from degraded fuel cells including: (a) using an array of fuel cells each having a low power output rating, and deactivating one of them during periods of reduced load, (b) using a parasitic load stack to regulate the power, and (c) controlling the flow of fuel and oxygen/air through the fuel cell.

It is an object of the present invention to provide a hybrid fuel cell based power plant that is able to profitably employ fuel cells for a period of time generally beyond their normal life span.

It is an additional object of the present invention to further increase the power output and efficiency of a hybrid fuel cell based power plant.

It is an additional object of the present invention to efficiently utilize the waste heat of a fuel cell for generating additional power in a power plant.

Other objects and advantages of the invention will become apparent as the description proceeds.

SUMMARY

The present invention provides a system for generating power from fuel cell waste heat, comprising at least one fuel cell module (FCM) for generating power and producing waste heat; a bottoming cycle power block (BCPB) through which a motive fluid circulates to generate power; a waste heat heat-transfer unit (WHHTU) for transferring heat from exhaust gases of said at least one FCM to said BCPB motive fluid thereby producing a desired combined power level from said at least one FCM and said BCPB.

The present invention is also directed to a method for controlling output power of a combined fuel cell-Rankine cycle power plant having a vaporizer and a turbine, comprising the steps of transferring heat from exhaust gases of said fuel cell to a motive fluid of a Rankine cycle power block; and controlling the amount of said transferred heat by controlling operation of a power plant related flow control component, thereby controlling an amount of motive fluid vapor supplied to a turbine of said Rankine cycle power block and reducing or slowing the rate of degradation or reduction over time of the electric power output of the combined fuel cell—Rankine cycle power plant as well as extending the time between required fuel cell overhauls in the combined fuel cell—Rankine cycle power plant.

DETAILED DESCRIPTION

The novel hybrid fuel cell power plant of the present invention employs a power block to recover heat that has heretofore been not utilized in prior art hybrid fuel cell based power plants, namely from degraded fuel cells.

As the power conversion efficiency of a fuel cell is reduced over time, the waste heat exhausted from a degraded fuel cell correspondingly increases. In order to at least partially compensate for the reduced output power generated from the degraded fuel cell, a waste heat heat-transfer unit (WHHTU) is installed, in accordance with the present invention, at an outlet port through which fuel cell exhaust gases are discharged. The WHHTU, which may be controllable, is adapted to transfer heat from these exhaust gases to the motive fluid of the bottoming cycle power block (BCPB).

Figure 1:
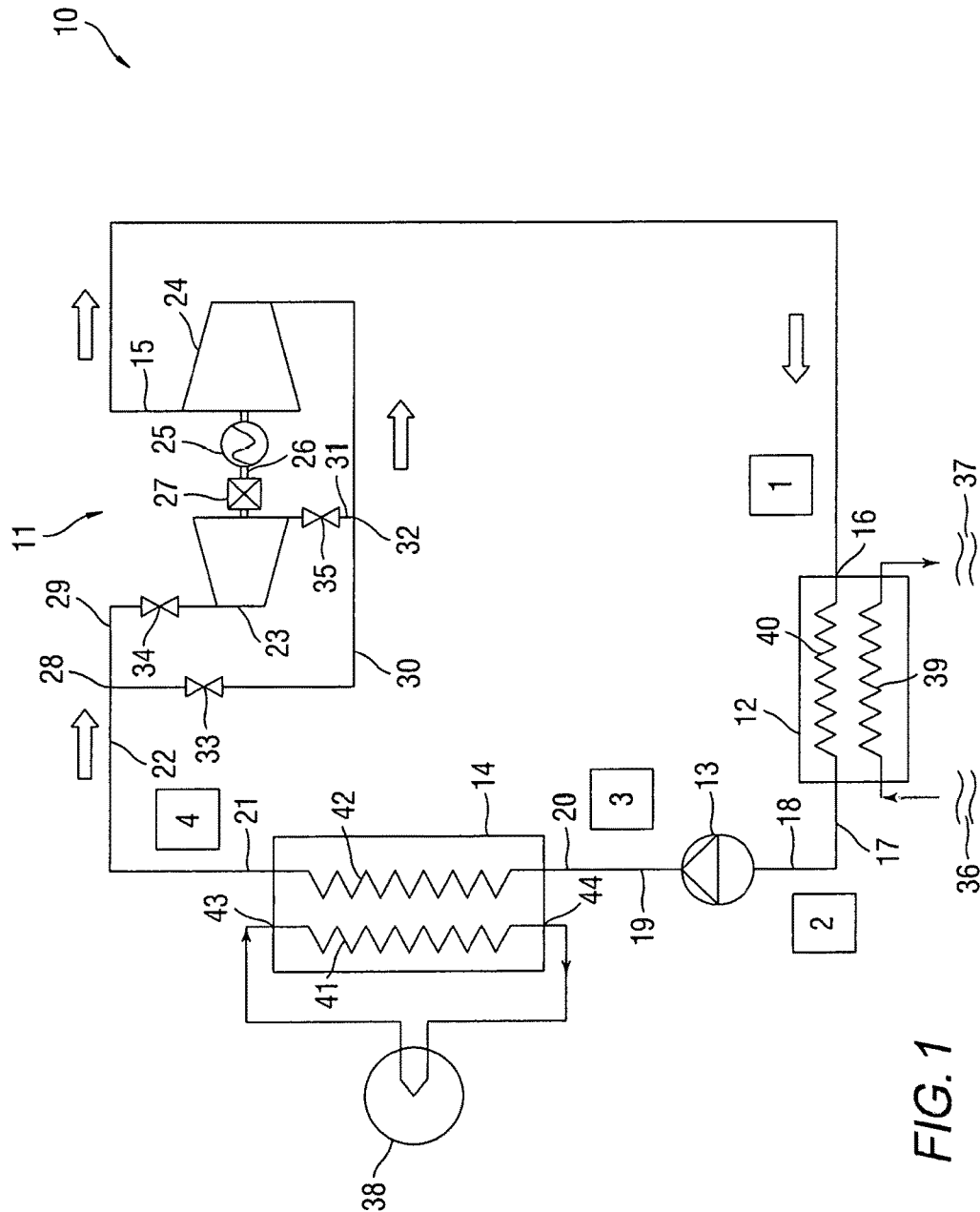
FIG. 1 is a schematic illustration of a hybrid fuel cell power plant, according to one embodiment of the present invention.

FIG. 1 schematically illustrates a hybrid fuel cell power plant 10 according to one embodiment of the present invention. Power plant 10 comprises stationary fuel cell module 5 and a bottoming cycle power block (BCPB) 15 whose motive fluid is in heat exchanger relation with exhaust gases (EG) discharged from outlet port 7 of fuel cell module 5. The added influx of thermal energy to the BCPB motive fluid provided by the EG produces a combined power level from fuel cell module 5 and BCPB 15 at an energy efficiency that is greater than what could be achieved if fuel cell module 5 and BCPB 15 were not combined in the manner taught by the present invention.

In order to provide a sufficient influx of thermal energy to the BCPB motive fluid, a WHHTU 12 is positioned to be in heat exchanger relation with a conduit 14 in fluid communication with outlet port 7 of fuel cell module 5, in order to adequately recover the high heat content of the fuel cell EG by transferring heat to the BCPB motive fluid.

The heat output of WHHTU 12 reacts to changes in the thermal capacity of the fuel cell EG. As the thermal capacity of the fuel cell EG will increase, the heat output of WHHTU 12 will also increase. When fuel cell module 5 is online to produce power, thus producing waste heat, WHHTU 12 will generally operate at full heat capacity and compensate, at least in part for degradation of fuel cell module 5 and the consequent increase in heat content of the fuel cell EG. However, at times when the electric generator of BCPB 15 undergoes an anticipated decrease in voltage output, or drooping, the heat capacity of WHHTU 12 may need to be regulated. Even so, the power output of BCPB 15 may be regulated by regulating the turbine bypass valve in order to adjust the total power output of power plant 10 to a suitable power output. Alternatively, if desired some of the EG flow may be diverted to a bypass stack.

BCPB 15 may operate under any thermodynamic cycle that has a motive fluid heatable by the EG and a turbine or any other expander by which the heated motive fluid is expandable to produce power. BCPB 15 advantageously operates under the Organic Rankine Cycle (ORC) by virtue of the unique characteristics of an organic motive fluid, a steam Rankine cycle, or other thermodynamic cycles, which are also within the scope of the present invention.

Fuel cell module 5 may be any high temperature fuel cell such as, but not limited to, SOFC and MCFC, which generates EG at a sufficiently high temperature, e.g. 375° C., which is suitable to increase the heat content of the BCPB motive fluid. Although only one fuel cell module 5 is illustrated, it will be appreciated that fuel cell module 5 may comprise a stack of fuel cells that are combinable in series or in parallel to generate a high level of power.

Likewise, although only one WHHTU 12 is illustrated, a plurality of WHHTU s may be deployed, for example one for each fuel cell if desired. The discharge from each WHHTU may be combined and then delivered to the given BCPB component, for increased heat transfer. If so desired, a single cycle pump for delivering a heat transfer medium to the various WHHTU s may be employed.

Fuel cells generate DC electricity by an electrochemical process whereby two electrodes pass charged ions in an electrolyte. Although the electric generator of BCPB 15 produces AC electricity, power plant 10 is able to combine the power output of both fuel cell module 5 and BCPB 15 by the use of power conditioning inverters to transform DC electricity into AC electricity, and then transmit the combined output to the electricity grid. Alternatively, the DC electricity, transformed to AC electricity, produced by fuel cell module 5 and the AC electricity produced by BCPB 15 may be transmitted in parallel to the electricity grid.

The combined or total electrical output of power plant 10 at any given time is of a certain value. However as time goes on, the power output of fuel cell module 5 decreases due to fuel cell degradation or a reduction in its energy efficiency, and consequently, the waste heat generated by fuel cell module 5 correspondingly increases. Consequently, BCPB 15 will produce increased electric power and compensate, at least in part, for the fuel cell degradation.

Controller 17 receives data that is indicative of the current heat content of the fuel cell EG, and is able to control operation of a power plant flow control component in response to the received data in order to maximize combined electrical output of power plant 10.

Advantageously, a heat flux sensor 19 may be deployed along conduit 14 of WHRU 12, to measure the total heat rate supplied by the EG which is applied to the sensor. Alternatively, advantageously, heat flux sensor 19 may be positioned along a conduit 9 of fuel cell module 5 which is upstream to outlet port 7. Controller 17, after receiving signal W from sensor 19 and determining that the heat content of the EG has increased above a predetermined threshold from a previous reading, if signal W is indicative of such data, transmits a control signal C to flow control component 22, causing the power output of BCPB 15 to increase. Thus, the use of BCPB 15 to exploit the increased level of waste heat is able to compensate for the reduction in power level produced by the degraded fuel cell module 5.

It will be appreciated that controller 17 may be in communication with any other type of sensor adapted to detect heat related data, such as temperature related data.

Flow control component 22 may be a bypass valve of BCPB 15 which is operative to usually decrease the flow rate of the motive fluid vapor to the turbine of BCPB 15, resulting in a decreased exploitation of the increased heat content of the EG. As a result, a reduced amount of motive fluid will be expanded in the turbine and will in turn cause less power to be generated. Alternatively, flow control component 22 may be a pump of WHHTU 12, which is operative to increase the flow rate of a heat transfer medium. Alternatively, these means could be used to increase the exploitation of the increased heat content of the EG If so desired, the flow control component may be a diverter, e.g. a bypass valve, for diverting some of the EG, if so desired to control or alter the temperature and flow rate of the EG.

Figure 2:
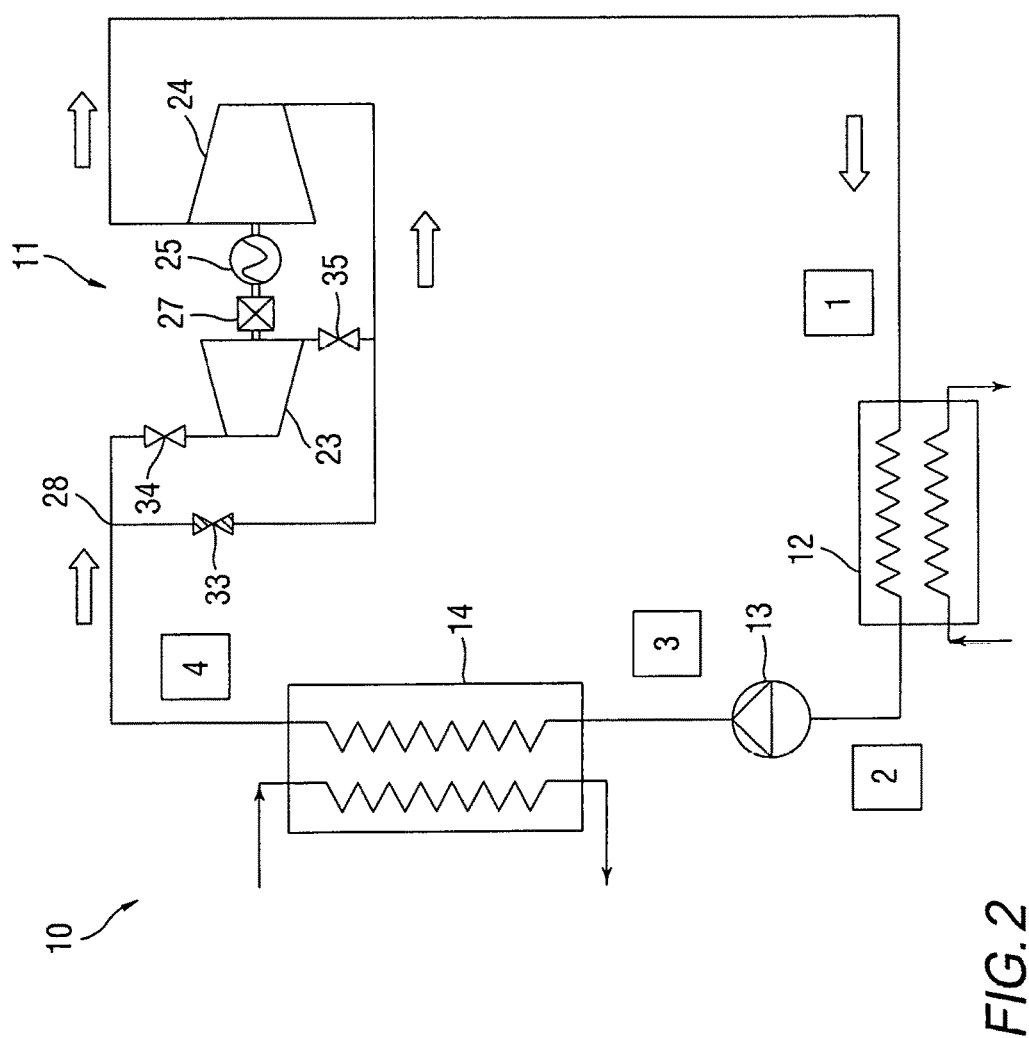
FIG. 2 is a schematic illustration of a hybrid fuel cell-ORC power plant with an indirectly heating waste heat recovery unit.

FIG. 2 illustrates one embodiment of a hybrid fuel cell-ORC power plant, which is generally indicated by numeral 40. Power plant 40 comprises fuel cell module 25, ORC block 35, and an indirectly heating WHHTU 45 configured as a waste heat oil heater (WHOH).

In ORC block 35, organic motive fluid flows from preheater 36 to vaporizer 37 via conduit 31, and the vaporized motive fluid flows via conduit 32 to vapor turbine 38 where it is expanded to produce rotational shaft power from vapor's expansion and to also produce electrical AC power by means of electric generator 39 which is coupled to vapor turbine 38. If chosen, a gear can or cannot be used to couple vapor turbine 38 to electric generator 39. The expanded motive fluid vapors are exhausted from turbine 38, optionally, to the shell side of recuperator 41 via conduit 33, and then flow via conduit 34 to condenser 42, which may be water or air cooled, so as to be cooled to a liquid state or condensate.

Cycle pump 43 delivers the organic condensate from condenser 42 via conduit 49 to the tube side of recuperator 41 and then to preheater 36 via conduit 51. The organic condensate is heated by the turbine exhaust at recuperator 41, and by a thermal oil heat transfer medium at preheater 36 and vaporizer 37.

The exhaust gases EG or waste heat discharged from fuel cell module 25 and having a certain heat content flows through exhaust line 27 to WHHTU 45. Thermal oil, or any other suitable heat transfer medium, circulating in a closed loop is delivered to WHHTU 45 via conduit 56 and absorbs heat from the EG, after which the ultra-clean emissions are exhausted via exhaust stack 48 to the atmosphere.

The heated thermal oil is introduced to vaporizer 37 and causes the motive fluid to vaporize. The heat depleted thermal oil flows via conduit 57 to preheater 36, whereby the heat content of the organic motive fluid liquid is increased or preheated, and then thermal oil cycle pump 59 operatively connected to conduit 56 delivers the thermal oil to WHHTU 45.

If it is desired to reduce the combined power level of power plant 40, or alternatively for safety purposes such as during an emergency, diverter valve 29 located in exhaust line 27 is activated to cause some or all of the EG to be diverted to bypass stack 26, from which the EG are exhausted to the ambient air. Diverter valve 29 may be manually activated according to the discretion of an operator, or alternatively may be automatically activated by means of controller 17 (FIG. 1) in response to a predetermined event. Diversion of EG to bypass stack 26 naturally results in a reduction of heat influx to the ORC motive fluid.

At times, an unanticipated emergency event occurs that dictates reduction in the power output of ORC block 35 even though WHHTU 45 has been operated at full capacity, i.e. diverter valve 29 is opened. In order to reduce the mass flow rate of the motive fluid vapor to the turbine, bypass valve 54 operatively connected to conduit 53 is opened to a desired degree and then a corresponding amount of motive fluid vapor flows via conduit 53 to condenser 42, which is designed to sufficiently cool the increased load of motive fluid provided by the bypassed organic fluid vapors in addition to the vapor load exhausted from turbine 38 via conduits 33 and 34. Furthermore, or in addition, turbine control valve 52 may be regulated.

On the other hand, if it is desired that WHHTU 45 supply an additional amount of heat to ORC block, e.g. if more heat is available in the EG, advantageously, controller 17 (FIG. 1) may send a control signal to thermal oil cycle pump 59 to circulate thermal oil at a greater flow rate through conduit 56 while bypass valve 54 is partially or completely closed by a control signal from controller 17, in order to supply more vapor to vapor turbine 38. E.g., WHHTU 45 is able to supply an additional amount of heat to ORC block 35 during periods of reduced efficiency of fuel cell module 25, for instance when the fuel cell module becomes degraded, whereby more heat is available in the hot exhaust gases EG. Alternatively, a temporary reduction of fuel cell efficiency may occur, correspondingly increasing the thermal content of the EG, so that the power output of vapor turbine 38 is temporarily increased.

Figure 3:
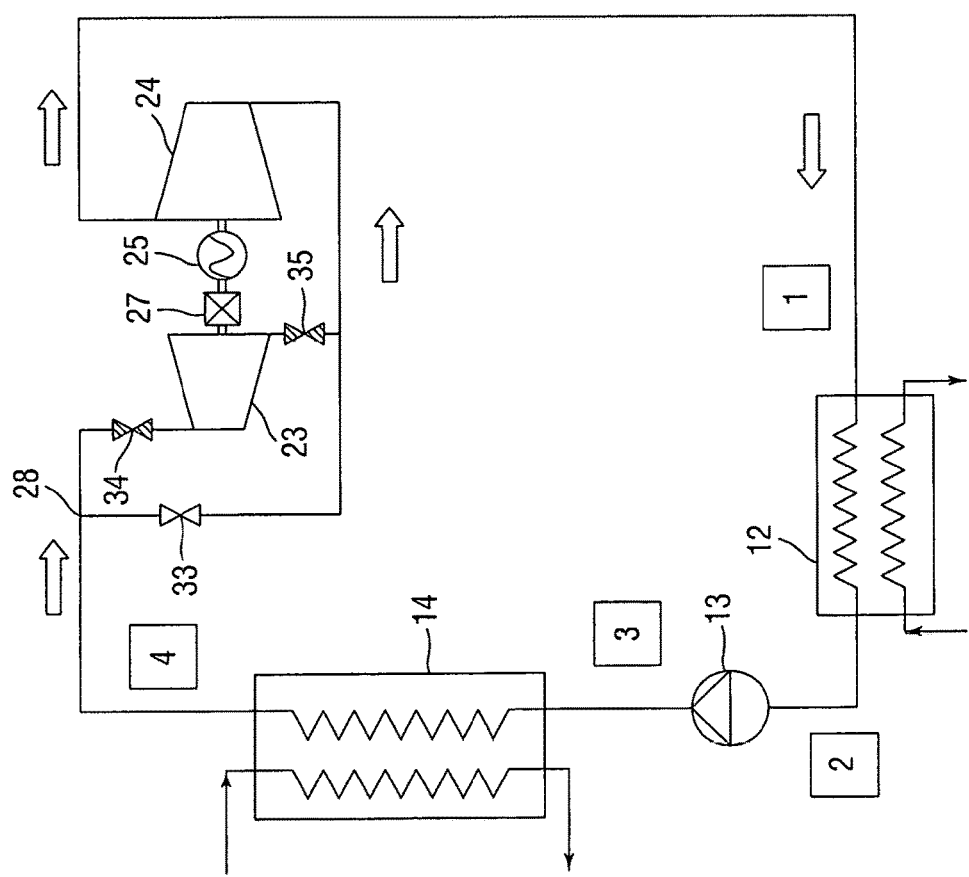
FIG. 3 is a schematic illustration of a hybrid fuel cell-ORC power plant with a directly heating waste heat recovery unit.
Figure 1:
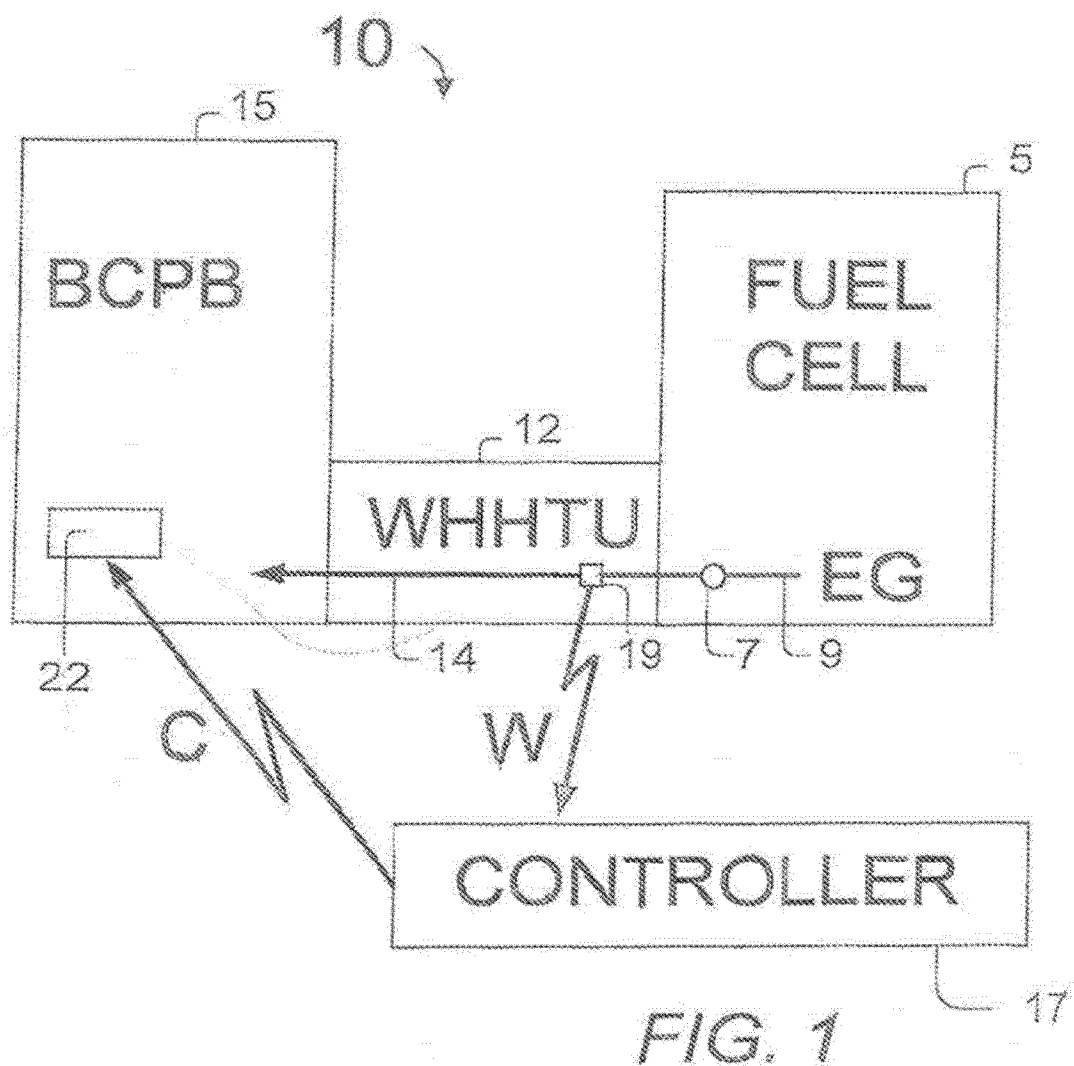
Figure 2:
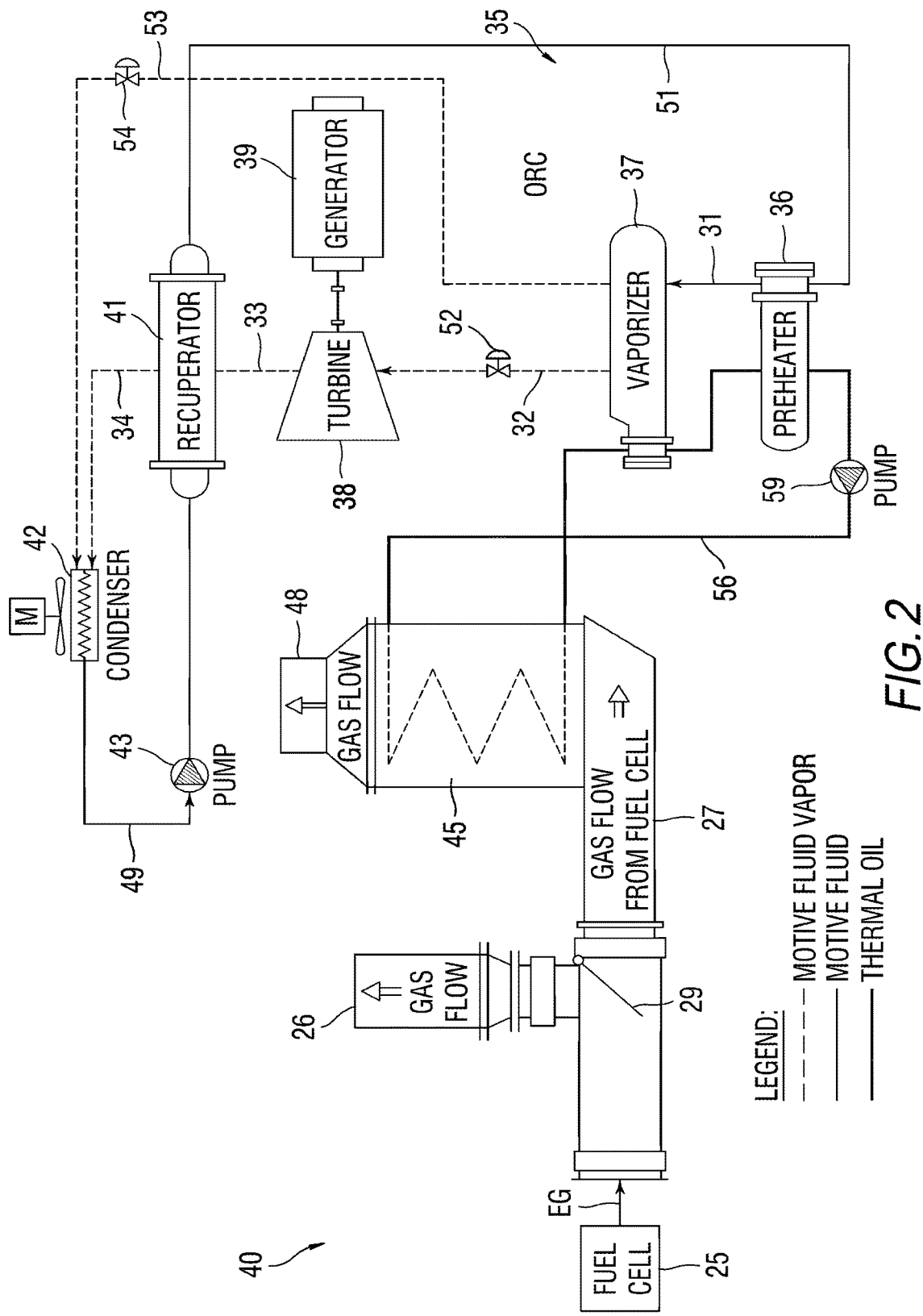
Figure 3:
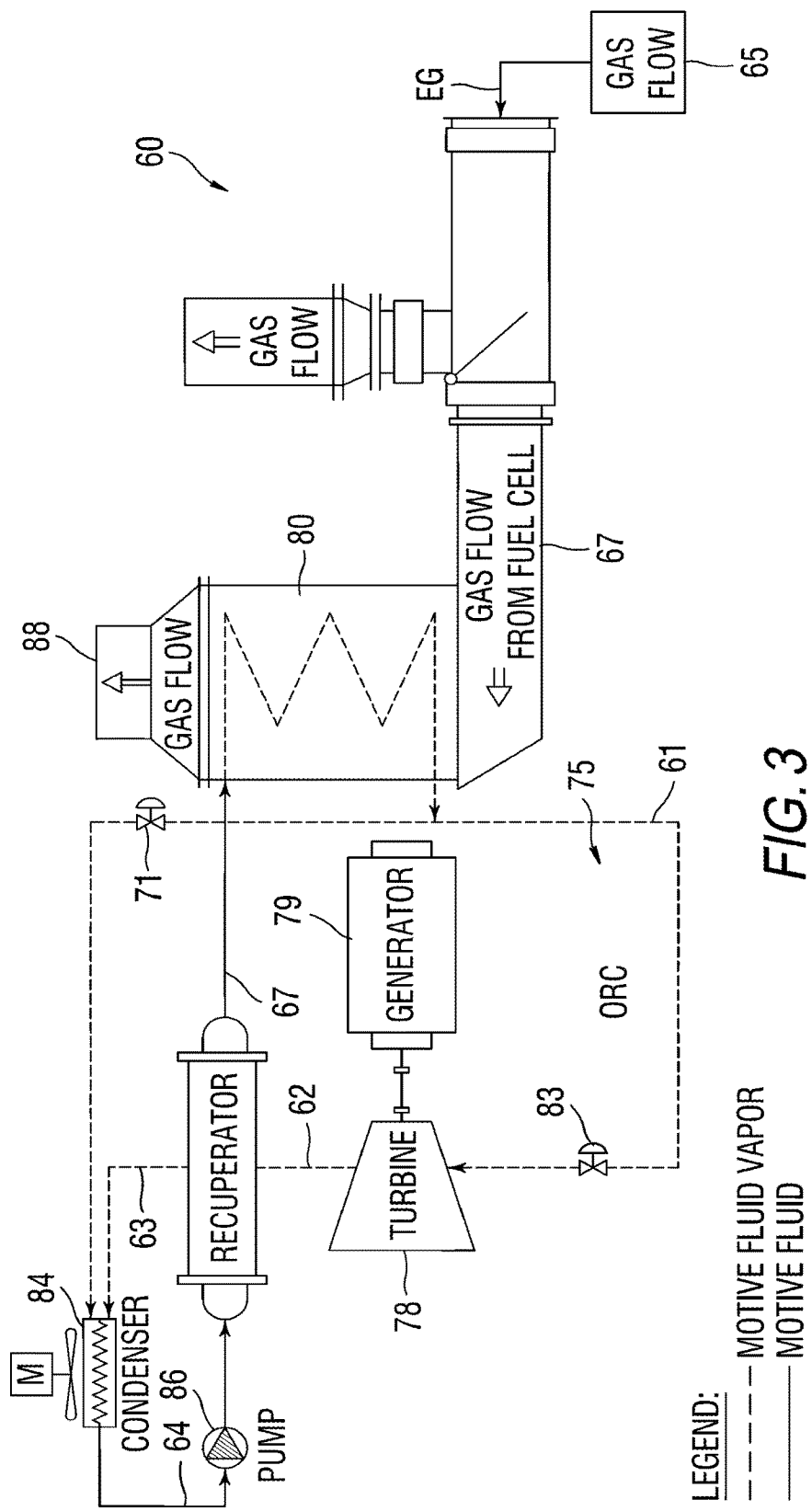

FIG. 3 illustrates another embodiment of a hybrid fuel cell—ORC power plant, which is generally indicated by numeral 60. Power plant 60 comprises fuel cell module 65, ORC block 75, and a directly heating WHHTU 80.

The exhaust gases EG or waste heat discharged from fuel cell module 65 and having a certain heat content flow through exhaust line 67 to WHHTU 80, which is a hot gas to motive fluid heat exchanger, and are exhausted via exhaust stack 88 to the ambient air.

The organic motive fluid flowing through the tube side of WHHTU 80 absorbs heat from the EG and consequently vaporizes. The motive fluid vapor produced exiting WHHTU 80 flows to vapor turbine 78 via conduit 61 when bypass valve 71 is closed. The motive fluid vapor then expands within turbine 78 to produce rotational shaft power from the vapor's expansion and electrical AC power by means of electric generator 79 coupled to vapor turbine 78. If chosen, a gear can or cannot be used to couple vapor turbine 38 to electric generator 39. The motive fluid vapors are exhausted from turbine 78 to the shell side of recuperator 82 via conduit 62, and then flow via conduit 63 to condenser 84, which may be water or air cooled, so as to be cooled to a liquid state or condensate.

Cycle pump 86 delivers the organic condensate from condenser 84, optionally, via conduit 64 to the tube side of recuperator 82 and then to WHHTU 80 via conduit 67, where the organic motive fluid condensate is vaporized.

When it is desired, e.g., to reduce the power output of ORC block 75, bypass valve 71, although usually closed, may be partially or completely opened so that a corresponding amount of motive fluid vapor flows via conduit 71 to condenser 84. Alternatively or in addition, turbine control valve 83 may be regulated. Also, the diverter can be used to divert portion of the EG to the atmosphere.

On the other hand, if it is desired that WHHTU 80 supply an additional amount of heat to ORC block, e.g. if more heat is available in the EG, advantageously controller 17 (FIG. 1) may send a control signal to bypass valve 71 in order to partially or completely close, in order to supply more vapor to vapor turbine 78. E.g., WHHTU 80 is able to supply an additional amount of heat to ORC block 35 during periods of reduced efficiency of fuel cell module 65, for instance when the fuel cell module becomes degraded, whereby more heat is available in the hot exhaust gases EG Although the above description referring to the drawings describes an organic Rankine cycle power block, it will be appreciated that the description hereinabove is quite applicable to a steam Rankine cycle. Usually, in such steam Rankine cycles, a recuperator is not included.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A system for generating power from fuel cell waste heat, comprising:
    at least one fuel cell module (FCM) for generating power and producing waste heat;
    a bottoming cycle power block (BCPB) through which a motive fluid circulates to generate power;
    a waste heat heat-transfer unit (WHHTU) for transferring heat from exhaust gases of said at least one FCM to said BCPB motive fluid, thereby producing a desired combined power level from said at least one FCM and said BCPB;
    a sensor for detecting heat data from the at least one FCM;
    a flow control component adapted to alter a power level of the BCPB; and
    a controller responsive to said sensor and operable to transmit a control signal to the flow control component to cause the power level of the BCPB to increase when the detected heat data indicates a value that has increased above a predetermined threshold.

2. The system for generating power according to claim 1, wherein efficiency of the at least one FCM is degraded as compared to a previous time when the detected heat data indicates a value that has not increased above a predetermined threshold.

3. The system for generating power according to claim 2, wherein an increase in the heat in the exhaust gases automatically brings about an increase in a power output of said BCPB.

4. The system for generating power according to claim 2, wherein an increase in the heat in the exhaust gases brings about an increase in the power output of said BCPB so that a power output increase is operator induced.

5. The system for generating power according to claim 2, wherein the flow control component causes the power level of the BCPB to decrease when the detected heat data indicates a value that has decreased below a predetermined threshold.

6. The system for generating power according to claim 1, wherein the BCPB is an Organic Rankine Cycle (ORC) power block which includes at least a vaporizer and a turbine.

7. The system for generating power according to claim 1 wherein the BCPB is a steam Rankine Cycle power block.

8. The system for generating power according to claim 1, wherein the heat data is temperature data or heat flux data.

9. The system for generating power according to claim 1, wherein the WHHTU includes a heat transfer medium for transferring heat from the exhaust gases to the BCPB motive fluid.

10. The system for generating power according to claim 9, wherein the controller is operable to transmit a control signal to the flow control component to regulate flow rate of the WHHTU heat transfer medium as well as flow rate of an organic motive fluid vapor supplied to a BCPB vapor turbine, in response to an increase in heat in the exhaust gases so as to produce a predetermined combined or total power level from the at least one FCM and the BCPB power block.

11. The system for generating power according to claim 1, wherein the flow control component is a diverter for diverting at least a portion of the exhaust gases.

12. The system for generating power according to claim 10, wherein the WHHTU comprises a closed loop conduit unit through which the heat transfer medium flows to a vaporizer which causes the BCPB motive fluid to vaporize and then the heat depleted heat transfer medium flows to a preheater for increasing the heat content of the BCPB motive fluid prior to being vaporized.

13. The system for generating power according to claim 1, wherein the WHHTU is adapted to directly heat BCPB motive fluid by the exhaust gases.

14. A method for controlling output power of a combined fuel cell-Rankine cycle power plant having a vaporizer and a turbine, comprising the steps of:
  transferring heat from exhaust gases of a fuel cell to a motive fluid of a Rankine cycle power block;
  determining that heat data from the fuel cell has increased above a predetermined threshold; and
  causing a power level of the Rankine cycle power block to increase when the heat data from the fuel cell has increased above a predetermined threshold.

15. The method according to claim 14, wherein an amount of supplied motive fluid vapor is controlled by means of a by-pass valve in relation to heat content of the exhaust gases of said fuel cell.

* * * * *

UNITED STATES PATENT AND TRADEMARK OFFICE
CERTIFICATE OF CORRECTION

PATENT NO. : 10,147,989 B2
APPLICATION NO. : 14/904768
DATED : December 4, 2018
INVENTOR(S) : Elad Shina et al.

It is certified that error appears in the above-identified patent and that said Letters Patent is hereby corrected as shown below:

In the Drawings

Please delete Figures 1-3 and replace with the attached new Figures 1-3.

Signed and Sealed this
Seventeenth Day of December, 2019

Andrei Iancu
*Director of the United States Patent and Trademark Office*